(12) United States Patent
Fletcher (10) Patent No.: US 7,428,568 B2
(45) Date of Patent: Sep. 23, 2008

(54) SYMMETRIC CASCADED DOMINO CARRY GENERATE CIRCUIT

(75) Inventor: Thomas D. Fletcher, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1214 days.

(21) Appl. No.: 09/956,903

(22) Filed: Sep. 21, 2001

(65) Prior Publication Data

US 2003/0126179 A1    Jul. 3, 2003

(51) Int. Cl.
*G06F 7/50* (2006.01)
*H03K 19/096* (2006.01)

(52) U.S. Cl. .......................................... 708/702; 326/95
(58) Field of Classification Search ......... 708/700–714; 326/95

See application file for complete search history.

(56) References Cited

U.S. PATENT DOCUMENTS

| | | | |
|---|---|---|---|
| 4,570,084 A | | 2/1986 | Griffin et al. |
| 4,667,303 A | * | 5/1987 | Pfennings ................ 708/702 |
| 5,450,340 A | * | 9/1995 | Nicolaidis ................ 708/531 |
| 5,568,069 A | | 10/1996 | Chow |
| 5,777,491 A | | 7/1998 | Hwang |
| 5,880,986 A | * | 3/1999 | Dedhia .................... 708/704 |
| 5,977,789 A | | 11/1999 | Gayles |
| 6,028,454 A | | 2/2000 | Elmasry et al. |
| 6,208,907 B1 | | 3/2001 | Durham et al. |
| 6,292,818 B1 | * | 9/2001 | Winters ................... 708/710 |
| 6,466,960 B1 | * | 10/2002 | Winters ................... 708/704 |
| 6,571,269 B1 | * | 5/2003 | Krishnamurthy et al. .... 708/710 |
| 6,952,297 B2 | * | 10/2005 | Wickman et al. ........... 708/844 |

FOREIGN PATENT DOCUMENTS

JP    5-259893    10/1993

OTHER PUBLICATIONS

Yee et al, "Clock-Delayed Domino for Dynamic Circuit Design", IEEE Transactions on Very Large Scale Integration (VLSI) Systems, vol. 8, No. 4, Aug. 2000, pp. 425-430.
Yee et al, "Clock-Delayed Domino for Adder and Combinational Logic Design", IEEE, 1063-6404/96, pp. 332-337, 1996.
Jung, Perepelitsa, Sobelman, "Time Borrowing in High-Speed Functional Units Using Skew-Tolerant Domino Circuits," Proceedings, IEEE International Symposium on Circuits and Systems, pp. V-641-V-644, 2000.
Presentation by Carl Sechen Output Prediction Logic: A high Performance CMOS Design Technique dated Mar. 17, 2000.
Taub, *Digital Circuits and Microprocessors*, pp. 205-212, McGraw-Hill, 1982.
Related U.S. Appl. No. 10/020,447, filed Dec. 18, 2001.
Related U.S. Appl. No. 09/892,565, filed Jun. 28, 2001.
Related U.S. Appl. No. 09/893,868, filed Jun. 29, 2001.

* cited by examiner

*Primary Examiner*—Chat C Do
(74) *Attorney, Agent, or Firm*—Kenyon & Kenyon LLP (57) ABSTRACT

A symmetric differential domino carry generate gate. In an embodiment, the load for the true inputs is equal to the load for the compliment inputs. In another embodiment, the output drive strength for the true output is the same as the output drive strength for the compliment output. In another embodiment, the symmetric differential domino carry generate gate has a first evaluation block of transistors and a second evaluation block of transistors, and the second evaluation block has the same number of transistors connected in a parallel relationship as the first evaluation block and the same number of transistors connected in a serial relationship as the first evaluation block.

13 Claims, 5 Drawing Sheets

Final Group Carry Generate Circuit 400

FIG. 5

SYMMETRIC CASCADED DOMINO CARRY GENERATE CIRCUIT

FIELD OF THE INVENTION

Embodiments of the present invention relate to logic gates. In particular, embodiments of the present invention relate to the topology of differential domino carry generate circuits.

BACKGROUND

A "carry generate gate" is a circuit that may be used as a building block for more complex logic circuits such as adders, 3-2 reducers, 4-2 reducers, and redundant-form adders. Carry generate circuits provide outputs, in accordance with known functionality, that are based upon data input bits. Multiple carry generate circuits may be used as building blocks in a more complex circuit, and different types of carry generate circuits may be used at different stages of the more complex logic circuit. Typically, different stages represent different bit positions of the input and/or output data. For example, a carry-look ahead adder may include a first stage carry generate gate, which may provide the first bit of a carry look-ahead, in addition to an intermediate carry generate circuit and a final group carry generate circuit. The output of earlier carry generate stages may be used as inputs to later stages. One type of carry generate circuit provides a "generate" output bit based on two data input bits and a "carry input" bit. A group carry generate circuit may be used to provide a group generate output for a particular stage based on a "propagate" input for that stage, a generate input for that stage, and a generate input for the previous stage. As another example, a final group carry circuit may be used to provide a "sum" output bit for a given bit position based on a propagate input for that bit position, a generate input for that bit position, a generate input for the previous bit position, and an exclusive-OR (XOR) input of the addends for the bit position. A person of skill in the art would appreciate that the generate input represents the results of an AND operation of the inputs a and b for that stage (i.e., $a_i$ AND $b_i$) and that the propagate input represents the results of an OR operation of the inputs a and b for that stage (i.e., $a_i$ OR $b_i$).

Carry generate circuits may be designed for use in cascaded differential domino circuits. A "domino circuit" is a type of circuit that is arranged in stages with the outputs from one stage (e.g., one gate) used as inputs into the next stage. The clock used with a domino circuit typically is delayed for each of the individual stages to provide a set-up time for the stages. The individual domino logic gates typically have one or more precharge blocks, which force the circuit to a known state during a precharge phase of a clock, and one or more evaluation blocks, which provide output values based on the input values during an evaluation phase of the clock. Domino circuits generally have a static stage in between the domino stages. For example, the domino circuit may have an inverter between the domino stages or a static complimentary metal-oxide semiconductor (CMOS) gate between the domino stages. By contrast, a cascaded domino circuit does not have any PMOS gates or transistors in the critical path of the logic. In a cascaded domino circuit, the outputs from one N-channel metal-oxide semiconductor (NMOS) domino gate (i.e., a gate with NMOS transistors in the evaluation block) may be directly connected to the inputs of another NMOS domino gate.

A "differential circuit" has complimentary sets of input and output terminals. The first set of input and output terminals may be referred to as the "true" inputs and outputs, and the second set may be referred to as the "compliment" inputs and outputs. For example, a differential adder circuit may have two true inputs "a" and "b" and may have a true output that outputs the result of an addition of a and b. This differential adder may also have two compliment inputs which receive the compliment values of that received by the corresponding true input (e.g., negative a and negative b) and a compliment output that outputs the compliment value of the true output (e.g., negative (a+b)).

Carry generate differential domino circuits may be difficult to design and manufacture because the true and compliment outputs of the circuit should begin to switch with the same edge rate and not be susceptible to pattern dependence and because the clock may arrive at the same time as the data or before the data. For these reasons, differential domino circuits such as cascaded differential domino carry generate circuits have not been widely used.

DETAILED DESCRIPTION

The present invention discloses topologies for differential domino carry generate circuits. The disclosed topologies may be more easily designed and manufactured than previous differential domino carry generate circuits while still predictably achieving the desired logic functionality. In embodiments of the present invention, the differential domino carry generate circuit is symmetric. As disclosed below, carry generate logic is within the class of logic that may be designed as a symmetrical circuit. In an embodiment, symmetry is achieved by arranging the compliment logic so that there are the same number of series and parallel transistors on both sides of the circuit.

Embodiments of the invention include a carry generate circuit (shown in FIGS. 1 and 5) that may be used to provide a carry generate output based on two data input bits and a carry input. Other embodiments include an intermediate group carry generate circuit (shown in FIG. 3) that may be used to provide a group generate output for a bit position (or stage) based upon a propagate input for that bit position, a generate input for that bit position, and a generate input for the previous bit position. Other embodiments include a final group carry generate circuit (shown in FIG. 4) which may provide a sum output for a bit position based on a propagate input for that bit position, a generate input for that bit position, a generate input for the previous bit position, and an exclusive-OR (XOR) input for the bit position.

Embodiments of the present invention may be constructed as cascaded differential domino circuits. In embodiments, the circuit has two evaluation blocks of NMOS transistors that together form an NMOS tree. A person of ordinary skill in the art would appreciate that transistors are a type of electrical switch that will output a value at a drain node based on a gate input and at a source input. In an embodiment, the carry generate circuit has a series NMOS transistor that is at the bottom of the NMOS tree and that is driven by the clock. In a further embodiment, the circuit includes PMOS keepers that are cross-coupled to provide protection against noise as they hold the data. According to one embodiment, the differential domino circuit of the present invention is designed so that the load or capacitance for the true inputs to the circuit is the same as the load for the compliment inputs to the circuit. In another embodiment, the Miller coupling is the same for the true inputs and complement inputs to the circuit. In a further embodiment, the output drive strength is the same for the true and compliment outputs of the circuit. These and other embodiments of the invention are discussed in more detail below.

Figure 1:
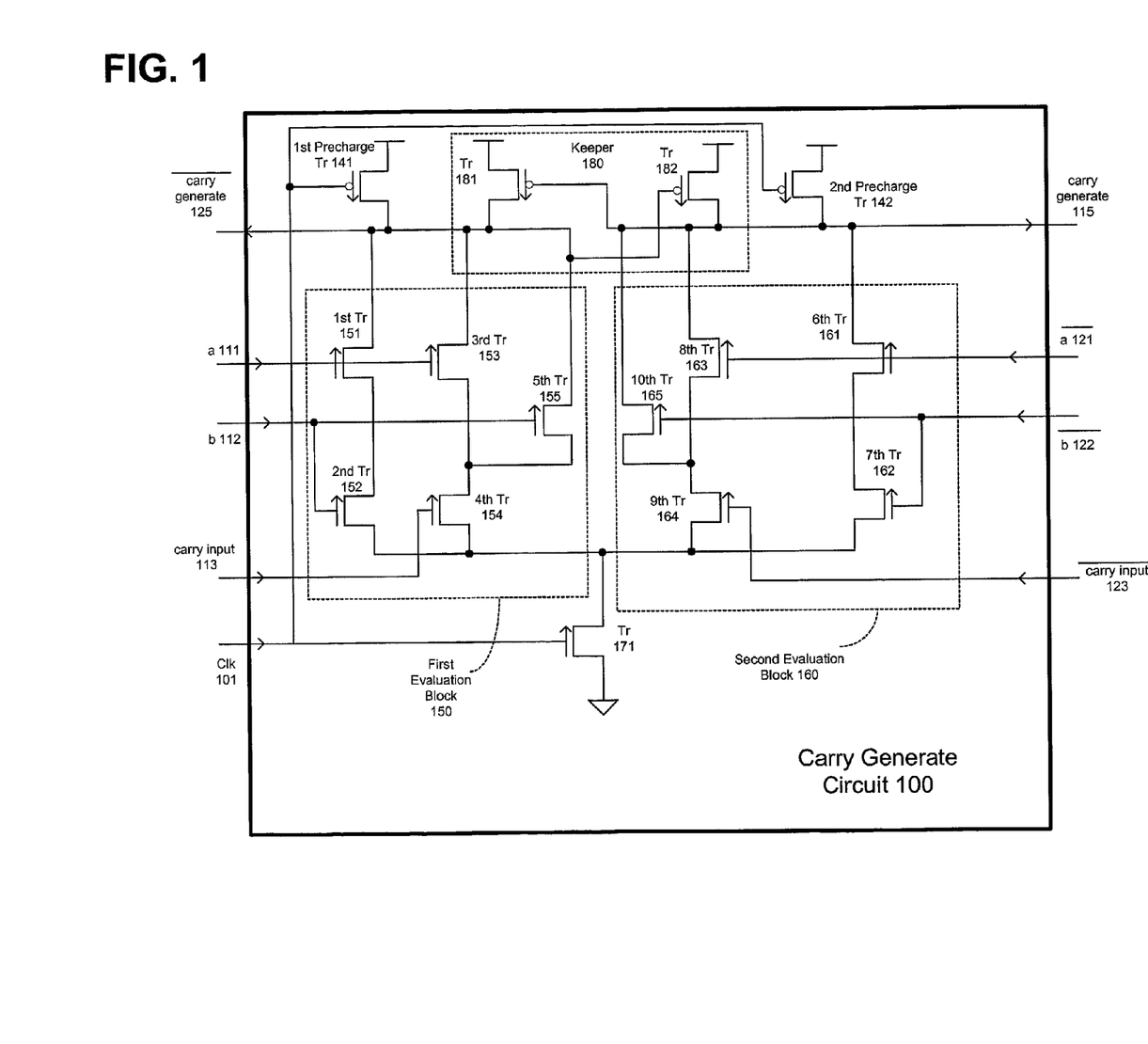
FIG. 1 is a block diagram of a symmetric differential domino carry generate circuit according to an embodiment of the present invention.

FIG. 1 is a block diagram of a symmetric differential domino carry generate circuit according to an embodiment of the present invention. FIG. 1 shows differential domino carry generate circuit 100 that may provide a carry generate bit (115) as an output based on two input data bits (a 111 and b 112) and a carry input bit (113). Carry generate circuit 100 has a clock input 101, an input for an data bit value "a" 111, an input for an data bit value "b" 112, and a carry input bit 113. These inputs are the "true" inputs to the circuit. As would be appreciated by a person of skill in the art, an input "value" that is received by carry generate circuit 100, or output by carry generate circuit 100, is a voltage range that represents a logical value. The inputs at a 111 and b 112 each may represent, for example, a single bit of two binary numbers being added by an adder of which carry generate circuit 100 may be a part. In this embodiment, and as would be appreciated by a person of skill in the art, the carry input 113 may be the carry from the previous logic stage.

Carry generate circuit 100 of FIG. 1 also has as compliment inputs "compliment a" 121, "compliment b" 122, and compliment carry input bit 123. The designations "negative" and "compliment" are used interchangeably herein. In an embodiment, compliment a 121 receives the compliment of the value received on a 111, compliment b 122 receives the compliment of the value received on b 122, and compliment carry input 123 receives the compliment of the value received on carry input 113. Carry generate circuit 100 also has a true carry generate output bit 115 and a compliment carry generate output bit 125. In this embodiment, compliment carry generate output 125 outputs the compliment of the true carry generate output 115. As would be appreciated by a person of skill in the art, in other embodiments the true carry output 115 may also be based upon the compliment inputs, and the compliment carry bit 125 may be based on the true inputs, because the true and carry inputs are direct compliments of each other.

In the embodiment shown in FIG. 1, differential domino carry generate circuit 100 has a transistor 171, two precharge transistors (first precharge transistor 141 and second precharge transistor 142), a keeper 180, a first evaluation block 150, and a second evaluation block 160. In this embodiment, transistor 171 has a source terminal ("source") connected to ground, a drain terminal ("drain") connected to first evaluation block 150 and second evaluation block 160, and a gate connected to clock input 101. As used herein, two circuit elements are connected if they are directly connected or indirectly connected to create an electrical path (i.e., as through an inter-connection line). Transistor 171 may be referred to as a "footer" transistor because it is at the bottom of the evaluation blocks. In this embodiment, footer transistor 171 is an NMOS transistor. In other embodiments, the circuit may not have a clocked transistor at the bottom of the evaluation stacks. In an embodiment, clock 101 is also connected to the gates of first precharge transistor 141 and second precharge transistor 142. In an embodiment, first precharge transistor 141 and second precharge transistor 142 are PMOS transistors, and the sources of first precharge transistor 141 and second precharge transistor 142 are each connected to Vcc. The drain of first precharge transistor 141 may be connected to compliment carry generate 125, and the drain of second precharge transistor 142 may be connected to carry generate 115. In this embodiment first precharge transistor 141 and second precharge transistor 142 determine outputs of carry generate circuit 100 during the precharge phase, and footer transistor 171 enables the determination of the outputs of carry generate circuit 100 by the evaluation blocks during the evaluation phase.

First evaluation block 150 and second evaluation block 160 each have a plurality of transistors. In the embodiment shown, first evaluation block 150 comprises five transistors (first transistor 151, second transistor 152, third transistor 153, fourth transistor 154, and fifth transistor 155) and second evaluation block 160 comprises five transistors (sixth transistor 161, seventh transistor 162, eight transistor 163, ninth transistor 164, and tenth transistor 165). In first evaluation block 150, the drain of first transistor 151 and of third transistor 153 is connected to compliment carry generate output 125. In addition, the source of first transistor 151 is connected to the drain of second transistor 152, the source of third transistor 153 is connected to the drain of fourth transistor 154, and the source of fifth transistor 155 is connected to the drain of fourth transistor 154. Finally, the source of second transistor 152 and of fourth transistor 154 is connected to footer transistor 171. In second evaluation block 160, the drain of sixth transistor 161 and of eighth transistor 163 is connected to carry generate output 115. In addition, the source of sixth transistor 161 is connected to the drain of seventh transistor 162, the source of eighth transistor 163 is connected to the drain of ninth transistor 164, and the source of tenth transistor 165 is connected to the drain of ninth transistor 164. Finally, the source of seventh transistor 162 and ninth transistor 164 are each connected to the drain of footer transistor 171. In this embodiment, the gate of each of the transistors in the first evaluation block 150 is connected to one of the true inputs, and the gate of each of the transistors in the second evaluation block 160 is connected to one of the compliment inputs. In particular, input a 111 is connected to the gate of first transistor 151 and to the gate of third transistor 153, input b 112 is connected to the gate of second transistor 152 and fifth transistor 155, and carry input 113 is connected to the gate of fourth transistor 154. In addition, compliment a 121 input is connected to the gate of sixth transistor 161 and to the gate of eighth transistor 163, compliment b input 122 is connected to the gate of seventh transistor 162 and tenth transistor 165, and compliment carry input 123 is connected to the gate of ninth transistor 164. The operation of the evaluation blocks in symmetric differential domino carry generate circuit 100 is described below with reference to FIG. 2.

Keeper 180 in carry generate circuit 100 includes a first keeper transistor 181 and second keeper transistor 182. In this embodiment, first keeper transistor 181 and second keeper transistor 182 are PMOS transistors, and the source nodes of first keeper transistor 181 and of second keeper transistor 182 are each connected to Vcc. In this embodiment, the drain of first keeper transistor 181 is connected to compliment carry generate output 125 and to the gate of second keeper transistor 182, and the drain of second keeper transistor 182 is connected to carry generate output 115 and to the gate of first keeper transistor 181. Thus, first keeper transistor 181 and second keeper transistor 182 are cross-coupled to each other. As discussed below, keeper 180 is used to temporarily store the values determined by first evaluation block 150 and second evaluation block 160. In other embodiments, the carry generate circuit does not use a keeper. In an embodiment, the PMOS keeper transistors are sized to prevent cross-capacitance noise from disturbing the state of the logic.

Figure 2:
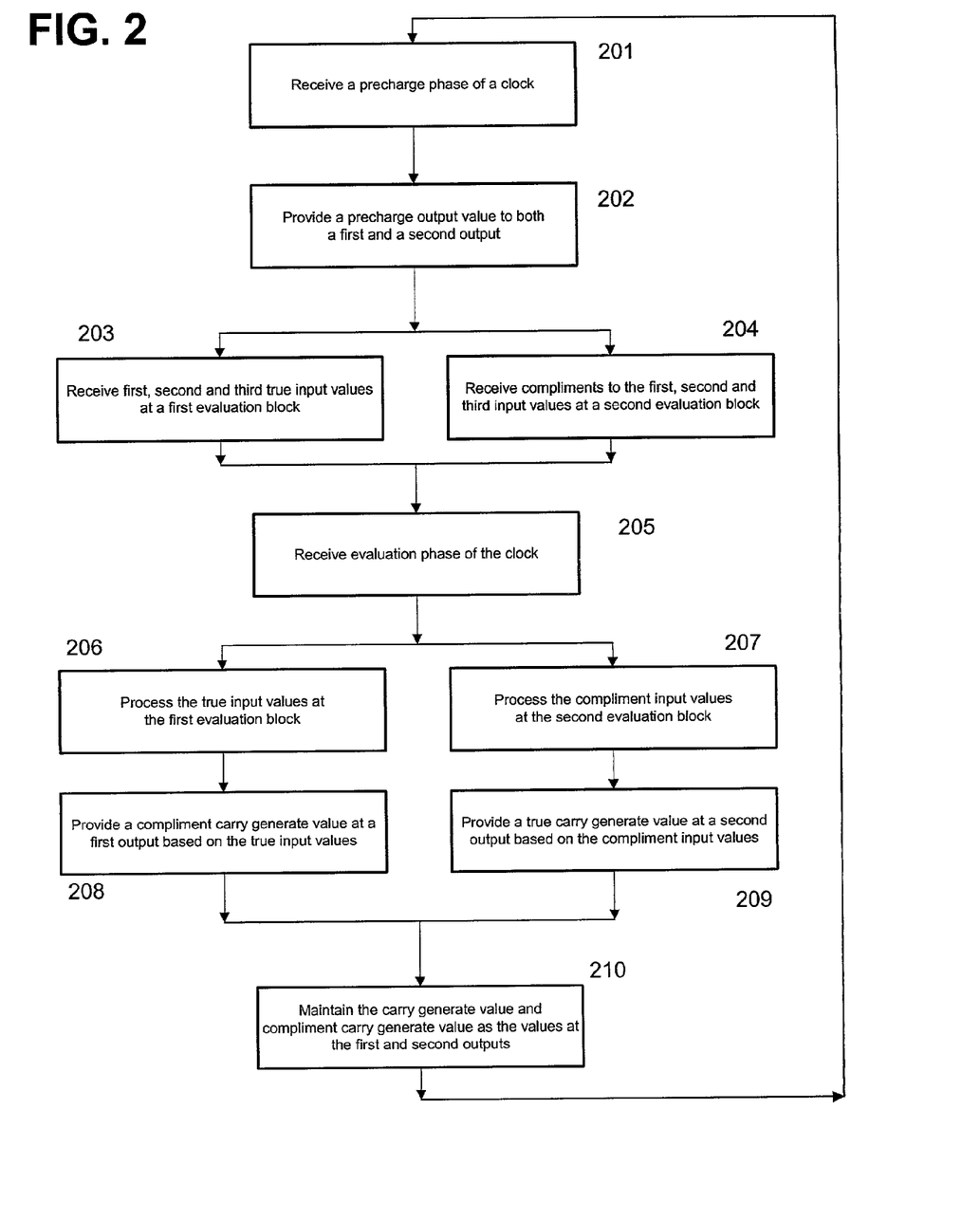
FIG. 2 is a flow diagram of a method of processing data in a symmetric differential domino carry generate circuit according to an embodiment of the present invention.

FIG. 2 is a flow diagram of a method of processing data in a symmetric carry generate circuit according to an embodiment of the present invention. The method shown in FIG. 2 will be discussed with reference to the carry generate circuit 100 shown in FIG. 1, but of course this method could also be used with other embodiments. A precharge phase of a clock may be first received by carry generate circuit 100 at clock input 101 (201). During the precharge phase, a precharge output value (e.g., a logical high) may be continuously provided at first and second outputs of the carry generate circuit such as at carry generate output 115 and compliment carry generate output 125 (202). As shown in FIG. 2, true and compliment input values may also be received during the precharge phase at inputs 111-113 and 121-123 (203 and 204). When the clock cycles to the evaluation phase (205), the precharge transistors may stop providing the precharge value at the outputs, and the footer transistor 171 may provide a current to transistors in first evaluation block 150 and second evaluation block 160. As shown in FIG. 2, the first evaluation block processes the true input values (206) and provides a compliment carry generate value at a first output based on these true input values (208). That is, the first evaluation block may provide an output at compliment carry generate 125 based on the true input values. At approximately the same time, the second evaluation block processes the compliment input values (207) and provides a carry generate value at a second output based on these compliment input values (209). That is, the second evaluation block may provide an output at carry generate 115 based on the compliment input values. Carry generate circuit 100 may maintain the carry generate and compliment carry generate values at the respective outputs (210) until the clock cycles back to the precharge phase, which causes the process to be repeated (201).

For the sake of simplicity, FIG. 2 shows a method that may be used in a standard domino arrangement in that evaluation phase of the clock arrives (205) after the data arrives (203-04). The disclosed carry generate circuit topologies may also be used in a cascaded domino arrangement, in which case the clock may arrive at the same time as the data or after the data.

The operation of carry generate gate 100 maybe described with the following Truth Table I:

| a 111 | 0 | 0 | 0 | 0 | 1 | 1 | 1 | 1 |
|---|---|---|---|---|---|---|---|---|
| b 112 | 0 | 0 | 1 | 1 | 0 | 0 | 1 | 1 |
| carry input 113 | 0 | 1 | 0 | 1 | 0 | 1 | 0 | 1 |
| Compliment Carry Gen. 125 | 0 | 0 | 0 | 1 | 0 | 1 | 1 | 1 |

As shown, compliment carry generate outputs a value of 1 only when either: (1) a 111 and b 112 both input a value of 1; (2) a 111 and carry input 113 input both input a value of 1; (3) b 112 and carry input 113 both input a value of 1; or (4) all three of a 111, b 112, and carry input 113 input a value of 1. For example, if a 111 and b 112 both input a value of 1, then during the evaluation phase second transistor 152 would pass a current (i.e., a value of 1) from transistor 171 to the source of first transistor 151, and transistor 151 will pass the current to compliment carry output 125. As a contrasting example, if b 112 and carry input 113 both input a value of 0, then there are no possible active paths though the first evaluation block from the current input to the compliment carry generate 125 output, and thus the output at compliment carry generate 125 would be a 0. A person of ordinary skill in the art would appreciate that second evaluation block 160 would operate in a similar manner.

As a consequence of its topology, the carry generate circuit 100 shown in FIG. 1 is a symmetric differential domino carry generate circuit. First evaluation block 150 and second evaluation block 160 both have a plurality of transistors connected in a parallel relationship to each other and a plurality of transistors connected in a serial relationship to each other. For example, first transistor 151 and second transistor 152 are in a serial relationship to each other because they are arranged serially as a stack along the path from the current input (footer transistor 171) to compliment carry generate output 125. As used herein, a current input is a path to ground, and a group of transistors in an evaluation block that is connected serially may be referred to as a "stack" of transistors. First transistor 151 is in a parallel relationship to each of third transistor 153, fourth transistor 154, and fifth transistor 155 because first transistor 151 is a parallel path (i.e., from the current input to the compliment carry generate output 125) as compared to third transistor 153, fourth transistor 154, and fifth transistor 155. Thus, first evaluation block 150 has three pair of transistors that are in serial relationship to one another and six pair of transistors that are in parallel relationship to each other. In this embodiment, the second evaluation block 160 has the same number of transistors in a parallel relationship as the first evaluation block 150. The number of transistors in a parallel relationship may be referred to as p. In this embodiment, the second evaluation block 160 has the same number of transistors in a serial relationship as first evaluation block 150. The number of transistors in a serial relationship may be referred to as s.

In an embodiment, the load for the true inputs of carry generate gate 100 (111-113) is the same as the load for the compliment inputs (121-123). In a further embodiment, the Miller coupling for the true inputs (111-113) is equal to the Miller coupling for the compliment inputs (121-123). In a still further embodiment, the output drive strength for the true carry generate output (115) is the same as the output drive strength for the compliment carry generate output (125). In an embodiment, the transistors in the first evaluation block (151-155) and in the second evaluation block (161-165) are NMOS transistors. In this embodiment, the circuit does not have any stacked PMOS devices. In an embodiment, the size of each of transistors in the first evaluation block and second evaluation block are 1.78 microns. In a further embodiment, the size of footer transistor 171 is 2.14 microns. In a further embodiment, the size of first precharge transistor 141, second precharge transistor 142, first keeper transistor 181, and second keeper transistor 182 are 1.52 microns. Of course, transistors with different sizes may also be used.

Figure 3:
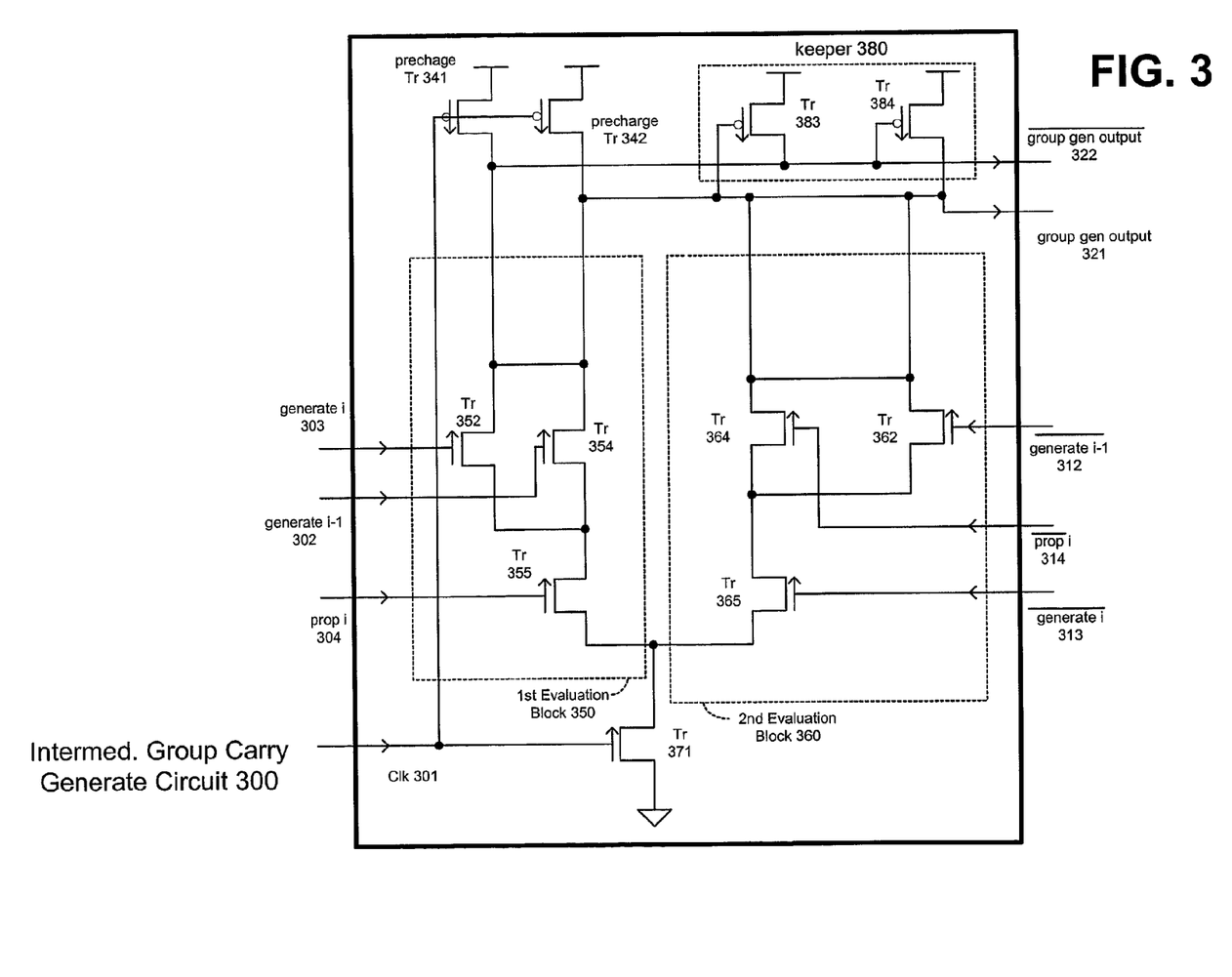
FIG. 3 is a block diagram of a symmetric differential domino intermediate group carry generate circuit according to an embodiment of the present invention.

FIG. 3 is a block diagram of a symmetric differential domino intermediate group carry generate circuit 300 according to an embodiment of the present invention. Group carry generate circuit 300 may be used to provide a group generate output 321 and a compliment group generate output 322 for a logic stage "i" based on three pair of true/compliment inputs. In this embodiment, the true inputs are generate$_i$ 303, generate$_{i-1}$ 302, and propagate$_i$ 304. In an embodiment, propagate$_i$ 304 inputs a propagate value for bit position i, generate$_i$ 303 inputs a generate value for bit position i, and generate$_{i-1}$ inputs a generate value for the i-1 bit position. As discussed above, a person of skill in the art would appreciate that the generate input represents the results of an AND operation of the inputs a and b for that stage (i.e., $a_i$ AND $b_i$) and that the propagate input represents the results of an OR operation of the inputs a and b for that stage (i.e., $a_i$ OR $b_i$). Compliment inputs to group carry generate circuit 300 are compliment generate$_i$ 313, compliment generate$_{i-1}$ 312, and compliment propagate$_i$ 314, which input the compliment values of the corresponding true inputs. As discussed above with regard to carry generate circuit 100, group carry generate circuit 300 has a first evaluation block 350, second evaluation block 360, footer transistor 371, keeper 380, and a pair of precharge transistors 341 and 342.

Group carry generate circuit 300 inputs a clock 301 which may be a delayed version of clock 101 of FIG. 1. In this embodiment, clock 301 is input to the gate of footer transistor 371 as well as to the gate of first precharge transistor 341 and second precharge transistor 342. The drain of footer transistor 371 is connected to ground. In this embodiment, footer transistor 371 is an NMOS transistor and the ground thus acts as current source. The source of first precharge transistor 341 and the source of second precharge transistor 342 are both connected to Vcc. In this embodiment, first precharge transistor 341 and second precharge transistor 342 are both PMOS transistors and thus Vcc acts as a current source. The drain of first precharge transistor 341 is connect to the compliment sum output 322, and the drain of second precharge transistor 342 is connected to the sum output 321. As discussed above, first precharge transistor 341 and second precharge transistor 342 may provide a precharge value at outputs 321 and 322 during the precharge phase of clock 301. During the evaluation phase of clock 301, footer transistor 371 passes current and acts as a current input to first evaluation block 350 and second evaluation block 360.

In this embodiment, first evaluation block 350 has three transistors (352, 354, and 355) and second evaluation block 360 has three transistors (362, 364, and 365). In first evaluation block 350, the drain of transistor 352 is connected to negative group generate output 322 and the source of transistor 352 is connected to the drain of transistor 355. The drain of transistor 354 is connected to group generate output 321 and the source of transistor 354 is connected to the drain of transistor 355. Finally, the drain of transistor 355 is connected to the source of footer transistor 371. Input generate$_i$ 303 is connected to the gate of transistor 352, input generate$_{i-1}$ 302 is connected to the gate of transistor 354, and input propagate$_i$ 304 is connected to the gate of transistor 355. In second evaluation block 360, the drain of transistor 362 is connected to group generate output 321 and the source of transistor 362 is connected to the drain of transistor 365. The drain of transistor 364 is also connected to group generate output 321 and the source of transistor 364 is connected to the drain of transistor 365. Finally, the source of transistor 365 is connected to the drain of footer transistor 371. Input negative generate$_{i-1}$ 312 is connected to the gate of transistor 362, input negative propagate$_i$ 314 is connected to the gate of transistor 364, and input negative generate$_i$ 313 is connected to the gate of transistor 365.

As discussed above, keeper 380 holds the results of the evaluation blocks. In this embodiment, keeper 380 has a pair of PMOS transistors 383 and 384. The gate of transistor 383 is coupled to the group generate output 321, and the gate of transistor 384 is coupled to the compliment group generate output 322. The drain transistor 383 is coupled to the compliment group generate output 322, and the drain of transistor 384 is coupled to the group generate output 321. The source of transistor 383 and the source of transistor 384 are coupled to Vcc, which thus acts as a current source.

A person of ordinary skill in the art would appreciate the operation of final group carry generate circuit 300 from the above description. The operation of this circuit is further described in the following Truth Table II.

| | | | | | | | | |
|---|---|---|---|---|---|---|---|---|
| generate$_{i-1}$ 302 | 0 | 0 | 0 | 0 | 1 | 1 | 1 | 1 |
| neg gen$_{i-1}$ 312 | 1 | 1 | 1 | 1 | 0 | 0 | 0 | 0 |
| generate$_i$ 303 | 0 | 0 | 1 | 1 | 0 | 0 | 1 | 1 |
| neg gen$_i$ 313 | 1 | 1 | 0 | 0 | 1 | 1 | 0 | 0 |
| propagate$_i$ 304 | 0 | 1 | 0 | 1 | 0 | 1 | 0 | 1 |
| neg prop$_1$ 314 | 1 | 0 | 1 | 0 | 1 | 0 | 1 | 0 |
| group generate output 321 | 1 | 1 | 1 | 0 | 1 | 1 | 1 | 0 |
| neg group generate out 322 | 0 | 0 | 0 | 1 | 0 | 0 | 0 | 1 |

As can be seen from Truth Table II above, the group generate output 321 will be a 0 only when the inputs propagate$_i$ 304 and generate$_i$ 303 are both 1. That is, generate output 321 will be driven high by the output of first evaluation block 350 when the input at propagate$_i$ 304 is a one and generate$_{i-1}$ 302 is a 1, and generate output 321 will be driven high by the output of second evaluation block 360 when the input at generate$_j$ 303 is a 0 (i.e., negative generates$_i$ 313 is a 1) and either generate$_{i-1}$ 302 is a 0 or propagate$_i$ 304 is a 0.

Figure 4:
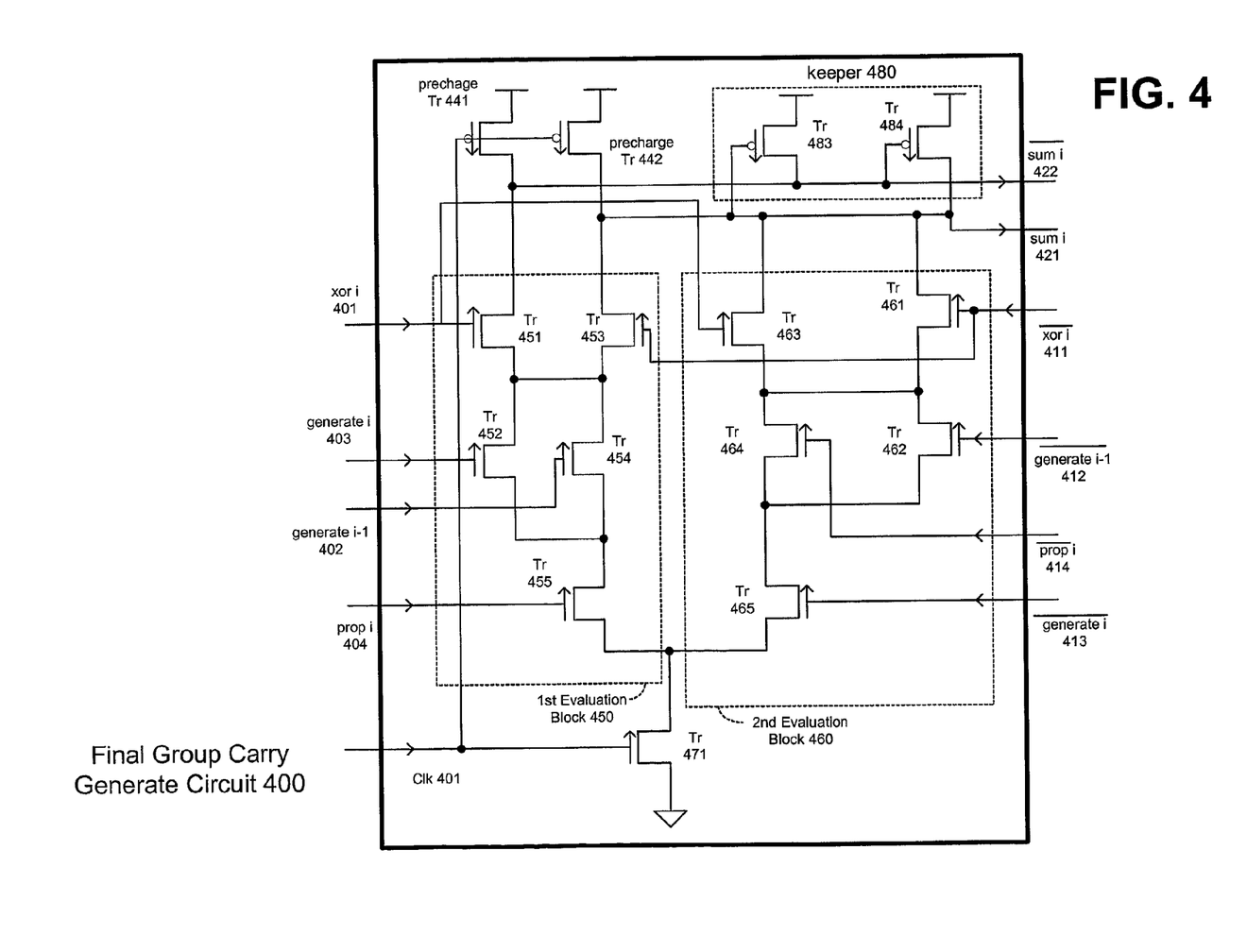
FIG. 4 is a block diagram of a symmetric differential domino final group carry generate circuit according to an embodiment of the present invention.

FIG. 4 is a block diagram of a symmetric differential domino final group carry generate circuit 400 according to an embodiment of the present invention. Final group carry generate circuit 400 provides a sum output 421 and a compliment sum output 422 for a bit position "i" based on four pair of true/compliment inputs. As can be seen, final group carry generate circuit 400 is similar to intermediate group carry generate circuit 300 of FIG. 3, except that final group carry generate circuit 400 also has a pair of XOR inputs and a top row of transistor logic (transistors 351, 353, 361, 363) and that the final group carry generate circuit 400 outputs a pair of sum outputs. In this embodiment, the true inputs are XOR$_i$ 401, generate$_i$ 403, generate$_{i-1}$ 402, and propagate$_i$ 404. In an embodiment, and as would be appreciated by a person of skill in the art, XOR$_i$ 401 inputs the results of exclusive-OR (XOR) function performed on the two data bits for that bit position. In an embodiment, propagate$_i$ 404 inputs a propagate value for bit position i, generate$_i$ 403 inputs a generate value for bit position$_i$, and generate$_{i-1}$ 402 inputs a generate value for the i-1 bit position. Compliment inputs to final group carry generate circuit 400 are compliment XOR$_i$ 411, compliment generate$_i$ 413, compliment generate$_{i-1}$ 412, and compliment propagate$_j$ 414, which input the compliment values of the corresponding true inputs. As discussed above with regard to intermediate carry generate circuit 300, final group carry generate circuit 400 has a first evaluation block 450, second evaluation block 460, footer transistor 471, keeper 480, and a pair of precharge transistors 441 and 442.

Final group carry generate circuit 400 inputs a clock 401 which may be a delayed version of clock 101 of FIG. 1. In this embodiment, clock 401 is input to the gate of footer transistor 471 as well as to the gate of first precharge transistor 441 and second precharge transistor 442. The drain of footer transistor 471 is connected to ground. In this embodiment, footer transistor 471 is an NMOS transistor and the ground thus acts as current source. The source of first precharge transistor 441 and the source of second precharge transistor 442 are both connected to Vcc. In this embodiment, first precharge transistor 441 and second precharge transistor 442 are both PMOS transistors, and Vcc acts as a current source. The drain of first precharge transistor 441 is connect to the compliment sum output 422, and the drain of second precharge transistor 442 is connected to the sum output 421. As discussed above, first precharge transistor 441 and second precharge transistor 442 may provide a precharge value at outputs 421 and 422 during the precharge phase of clock 401. During the evaluation phase of clock 401, footer transistor 471 passes current and acts as a current input to first evaluation block 450 and second evaluation block 460.

In this embodiment, first evaluation block 450 has five transistors (451-455) and second evaluation block 460 has five transistors (461-465). In first evaluation block 450, the drain of transistor 451 is connected to compliment sum$_i$ output 422 and the source of transistor 451 is connected to the drain of transistor 452. The source of transistor 452 is connected to the drain of transistor 455. The drain of transistor 453 is connected to sum$_i$ output 421 and the source of transistor 453 is connected to the drain of transistor 454. The source of transistor 454 is connected to the drain of transistor 455. Finally, the drain of transistor 455 is connected to the source of footer transistor 471. Input XOR$_i$ 401 is connected to the gate of transistor 451, input generate$_i$ 403 is connected to the gate of transistor 452, input compliment XOR$_i$ 411 is connected to the gate of transistor 453, input generate$_{i-1}$ 402 is connected to the gate of transistor 454, and input propagate$_i$ 404 is connected to the gate of transistor 455.

In second evaluation block 460, the drain of transistor 461 is connected to sum$_i$ output 421 and the source of transistor 461 is connected to the drain of transistor 462. The source of transistor 462 is connected to the drain of transistor 465. The drain of transistor 463 is connected to sum$_i$ output 421 and the source of transistor 463 is connected to the drain of transistor 464. The source of transistor 464 is connected to the drain of transistor 465. Finally, the source of transistor 465 is connected to the drain of footer transistor 471. Input compliment XOR$_i$ 411 is connected to the gate of transistor 461, input negative generate$_{i-1}$ 412 is connected to the gate of transistor 462, input XOR$_i$ 401 is connected to the gate of transistor 463, input negative propagate$_i$ 414 is connected to the gate of transistor 464, and input negative generate$_i$ 413 is connected to the gate of transistor 465.

As discussed above, keeper 480 holds the results of the evaluation blocks. In this embodiment, keeper 480 has a pair of PMOS transistors 483 and 484. The gate of transistor 483 is coupled to the sum$_i$ output 421, and the gate of transistor 484 is coupled to the compliment sum$_i$ output 422. The drain transistor 483 is coupled to the compliment sum$_i$ output 422, and the drain of transistor 484 is coupled to the sum$_i$ output 421. The source of transistor 483 and the source of transistor 484 are coupled to Vcc, which thus acts as a current source.

A person of ordinary skill in the art would appreciate the operation of final group carry generate circuit 400 from the above description. The operation of this circuit is further described in the following two-part Truth Table III. For the purposes of presentation, the first part of Truth Table III shows the cases when propagate$_i$ 404 is 0 and the second part of Truth Table III shows the cases when propagate$_i$ 404 is 1. In addition, the compliments to the inputs generate$_{i-1}$ 402, generate$_i$ 403, and propagate$_i$ 404 are not shown.

| | | | | | | | | |
|---|---|---|---|---|---|---|---|---|
| XOR$_i$ 401 | 0 | ~~0~~ | 0 | ~~0~~ | 1 | ~~1~~ | 1 | ~~1~~ |
| neg. XOR$_i$ 411 | 1 | ~~1~~ | 1 | ~~1~~ | 0 | ~~0~~ | 0 | ~~0~~ |
| generate$_{i-1}$ 402 | 0 | ~~0~~ | 1 | ~~1~~ | 0 | ~~0~~ | 1 | ~~1~~ |
| generate$_i$ 403 | 0 | ~~1~~ | 0 | ~~1~~ | 0 | ~~1~~ | 0 | ~~1~~ |
| propagate$_i$ 404 | 0 | ~~0~~ | 0 | ~~0~~ | 0 | ~~0~~ | 0 | ~~0~~ |
| sum$_i$ 421 | 0 | ~~0~~ | 0 | ~~0~~ | 0 | ~~0~~ | 0 | ~~0~~ |
| neg. sum$_i$ 422 | 1 | ~~1~~ | 1 | ~~1~~ | 1 | ~~1~~ | 1 | ~~1~~ |
| XOR$_i$ 401 | 0 | 0 | 0 | 0 | 1 | 1 | 1 | 1 |
| neg. XOR$_i$ 411 | 1 | 1 | 1 | 1 | 0 | 0 | 0 | 0 |
| generate$_{i-1}$ 402 | 0 | 0 | 1 | 1 | 0 | 0 | 1 | 1 |
| generate$_i$ 403 | 0 | 1 | 0 | 1 | 0 | 1 | 0 | 1 |
| propagate$_i$ 404 | 1 | 1 | 1 | 1 | 1 | 1 | 1 | 1 |
| sum$_i$ 421 | 0 | 0 | 1 | 1 | 0 | 1 | 0 | 1 |
| neg. sum$_i$ 422 | 1 | 1 | 0 | 0 | 1 | 0 | 1 | 0 |

The inputs and outputs for four of the columns in the first part of Truth Table III are struck-through because in this embodiment these cases would not occur during the operation of final group carry generate circuit 400. That is, if it is assumed that the generate$_i$ input is based on the operation $a_i$ AND $b_i$, and the propagate$_i$ input is based on the operation $a_i$ OR $b_i$, then the input at propagate$_i$ will never be 0 if the input at generate$_i$ is 1. This logical dependancy is a requirement for the operation of this circuit in an embodiment as a final group carry generate circuit and allows the circuit to be designed symmetrically.

Figure 5:
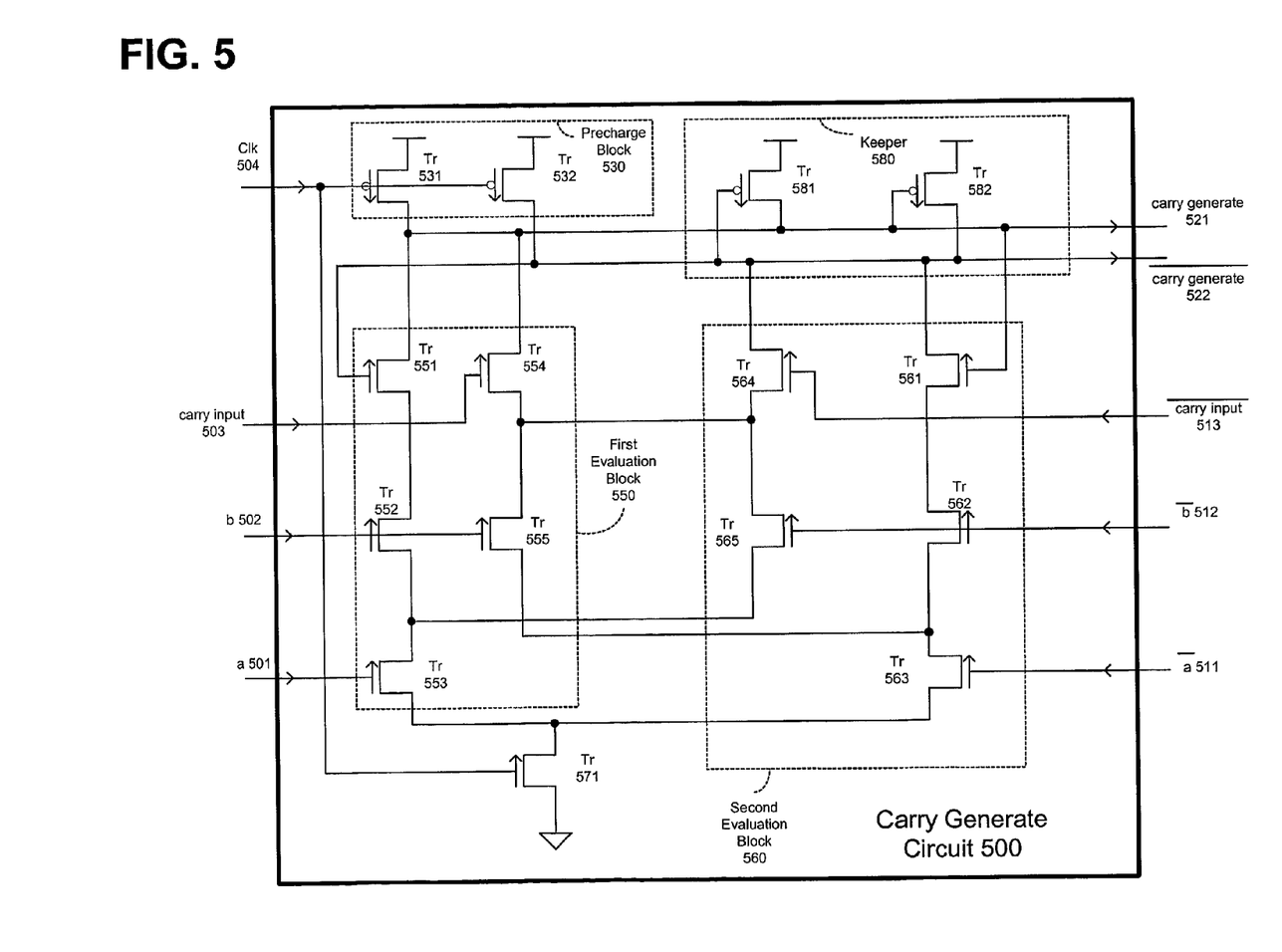
FIG. 5 is a block diagram of a symmetric differential domino carry generate circuit according to another embodiment of the present invention.

FIG. 5 is a block diagram of a symmetric differential domino carry generate circuit according to another embodiment of the present invention. The carry generate circuit 500 shown in FIG. 5 performs the same function as the carry generate gate 100 of FIG. 1. The relationship between the inputs and outputs for carry generate circuit 500 can also be described by the Truth Table I shown above. Carry generate circuit 500 also has two pair of data bit inputs (a 501, b 502, compliment a 511, and compliment b 502) as well as a pair of carry inputs (true carry input 503 and compliment carry input 513). Carry generate circuit 500 also has a clock input 504 which may input a clock like that input to clock input 101 of FIG. 1. Finally, carry generate circuit 500 has a true carry generate output 521 and a compliment carry generate output 522.

As with the circuits discussed above, carry generate circuit 500 has a precharge block 530 with two precharge transistors (531 and 532), a keeper 580 with two transistors (581 and 582), a footer transistor 571, a first evaluation block 550, and a second evaluation block 560. As also discussed above, the transistors in the precharge block 530 are shown as PMOS transistors, the clock 504 is input to the gate of the transistors in the precharge block 530, the sources of the precharge transistors are connected to Vcc, the drain of the first precharge transistor 531 is connected to carry generate 521, and the gate of the second precharge transistor 532 is connected to compliment carry generate 522. The keeper transistors 581 and 582 are also shown as PMOS transistors with their drains connected to Vcc. The keeper transistors are cross-coupled. The gate of transistor 582 is connected to the drain of transistor 581, and the gate of transistor 581 is connected to the drain of transistor 582. In addition, the drain of transistor 581 is connected to carry generate output 521 and the drain of transistor 582 is connected to compliment carry generate output 522. The source of footer transistor 571 is connected to ground, and the gate of footer transistor 571 is connected to both the first evaluation block 550 and the second evaluation block 560.

There are five transistors in the first evaluation block 550 (551-555) and five transistors in the second evaluation block 560 (561-565). In the first evaluation block, the drain of transistors 551 and 554 is connected to carry generate output 521. The source of transistor 551 is connected to the drain of transistor 552, the drain of transistor 552 is connected to the source of transistor 553, and the source of transistor 553 is connected to the drain of transistor 571. The source of transistor 554 is connected to the drain of transistor 555 and to the drain of transistor 565, and the source of transistor 555 is connected to the drain of transistor 563. Input a 501 is connected to the gate of transistor 553, input b 502 is connected to the gate of transistor 552 and the gate of transistor 555, and true carry input 503 is connected to the gate of transistor 554. The gate of transistor 551 is connected to the sources of transistors 564 and 561. In the second evaluation block, the drain of transistors 561 and 564 is connected to compliment carry generate output 522. The source of transistor 561 is connected to the drain of drain 562, the source of transistor 562 is connected to the drain of transistor 563, and the source of transistor 563 is connected to the drain of transistor 571. The source of transistor 564 is connected to the drain of transistor 565 and to the drain of transistor 555, and the source of transistor 565 is connected to the drain of transistor 553. Input compliment a 511 is connected to the gate of transistor 563, input compliment b 512 is connected to the gate of transistor 562 and the gate of transistor 565, and compliment carry input 513 is connected to the gate of transistor 564. The gate of transistor 561 is connected to compliment carry generate 522.

A person of ordinary skill in the art would appreciate that carry generate circuit 500 is a symmetrical differential domino carry generate gate. In the embodiment shown, the gate of transistor 551 and 561 are connected to the outputs of the opposite evaluation blocks in order to slow down the corresponding paths so that the delays would be equal.

As discussed above, the present invention provides topologies for symmetrical cascaded differential domino carry generate circuits. Because the disclosed circuits are symmetric, they may be easier to design and manufacture. In embodiments of the invention, the carry generate circuit has the same number of series and parallel transistors on both sides of the circuit. A cascaded domino circuit such as those disclosed is relatively fast because the circuit does not need to wait for the input to reach Vcc/2 (the gate threshold) before beginning to switch. The differential logic may act as a sense amp and allow for the clock to drive the transition with small differentials on the inputs. In addition, embodiments of the cascaded differential domino circuit of the present invention do not have any stacked PMOS devices. Elimination of the static stages in the topology may decrease the delay of the circuit. The disclosed cascaded differential domino circuit may also have reduced leakage current and reduced circuit size because the threshold voltage (Vt) of transistors in the critical path may be lowered. Use of a higher NMOS stack may also reduce leakage current.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, in other embodiments the size of the stacks in the evaluation blocks may be increased and/or decreased, the number of parallel stacks in the evaluation blocks may be increased and/or decreased, and/or the inputs may be connected to different transistors.

What is claimed is:

1. An apparatus comprising:
    a first output to provide a precharge value during a precharge phase and a true carry generate value during an evaluation phase;
    a second output to provide the precharge value during the precharge phase and the compliment of the true carry generate true during the evaluation phase;
    a current input;
    a first evaluation block connected to the current input and the second output and having a plurality of transistors, wherein a number of said transistors are connected in a parallel relationship and a number of said transistors are connected in a serial relationship, wherein the first evaluation block comprises a first transistor with a drain connected to the second output, a second transistor with a drain connected to the source of the first transistor and a source connected to the current input, a third transistor with a drain connected to the second output, a fourth transistor with a drain connected to the source of the third transistor and a source connected to the current input, and a fifth transistor with a drain connected to the second output and a source connected to the drain of the fourth transistor; and
    a second evaluation block connected to the current input and the first output and having a plurality of transistors, wherein the second evaluation block has the same number of transistors connected in a parallel relationship as the first evaluation block and the same number of transistors connected in a serial relationship as the first evaluation block.

2. The apparatus of claim 1, wherein the output drive strength for the first output is the same as the output drive strength for the second output.

3. The apparatus of claim 1, wherein the circuit further comprises a clock input to receive a clock having precharge and evaluation phases.

4. The apparatus of claim 3, wherein the current input is a transistor having a source node connected to ground and a gate connected to the clock input.

5. The apparatus of claim 4, wherein the gate of each transistor in the first evaluation block is connected to one of a set of true inputs and the gate of each of the transistors in the second evaluation block is connected to one of a set of compliment inputs, and wherein the load for the true inputs is the same as the load for the compliment inputs.

6. An apparatus comprising:
    a true sum to provide a precharge signal during the precharge phase and the result of a sum function during the evaluation phase;
    a compliment sum output to provide the precharge signal during the precharge phase and the compliment of the true sum output during the evaluation phase;
    a current input;
    a first evaluation block connected to the current input, the true sum output, and the compliment sum output, wherein the first evaluation block has a plurality of transistors, and wherein a number of said transistors are connected in parallel and a number of said transistors are connected in serial, wherein the first transistor has a drain connected to the compliment sum output, the second transistor has a drain connected to the source of the first transistor and a source connected to the drain of the fifth transistor, the third transistor has a drain connected to the true sum output, the fourth transistor has a drain connected to the source of the third transistor and a source connected to the drain of the fifth transistor, and the fifth transistor has a source connected to the current input; and
    a second evaluation block connected to the current input and the true sum output and having a plurality of transistors, wherein the second evaluation block has the same number of transistors connected in parallel as the first evaluation block and the same number of transistors connected in serial as the first evaluation block.

7. The apparatus of claim 6, wherein the output drive strength for the true sum output is the same as the output drive strength for the compliment sum output.

8. The apparatus of claim 6, wherein the gate of the first transistor is connected to an exclusive-OR input, the gate of the second transistor is connected to a first generate input, the gate of the third transistor is connected to a compliment exclusive-OR input, the gate of the fourth transistor is connected to a second generate input, and the gate of the fifth transistor is connected to a propagate input.

9. The apparatus of claim 6, wherein the transistors in the first evaluation block and second evaluation block are N-channel metal-oxide semiconductor (NMOS) transistors.

10. An apparatus comprising:
a first output to provide a precharge value during a precharge phase and a true carry generate value during an evaluation phase;
a second output to provide the precharge value during the precharge phase and the compliment of the true carry generate true during the evaluation phase;
a current input;
a first evaluation block connected to the current input and the second output and having a plurality of transistors, wherein a number of said transistors are connected in a parallel relationship and a number of said transistors are connected in a serial relationship, wherein the first evaluation block comprises a first transistor with a drain connected to the second output, a second transistor with a drain connected to the source of the first transistor and a source connected to the current input, a third transistor with a drain connected to the second output, a fourth transistor with a drain connected to the source of the third transistor and a source connected to the current input, and a fifth transistor with a drain connected to the second output and a source connected to the drain of the fourth transistor; and a second evaluation block connected to the current input and the first output and having a plurality of transistors, wherein the second evaluation block has the same number of transistors connected in a parallel relationship as the first evaluation block and the same number of transistors connected in a serial relationship as the first evaluation block wherein the circuit further comprises a clock input to receive a clock having precharge and evaluation phases and further wherein the gates of the first transistor and third transistor are connected to a first of the true inputs, the gates of the second transistor and fifth transistor are connected to a second of the true inputs, and the gate of the fourth transistor is connected to a third of the true inputs.

11. The apparatus of claim 10, wherein the precharge block comprises a first precharge transistor connected to a second current input and a second precharge transistor connected to a third current input, and wherein the first and second precharge transistors each have a gate connected to the clock.

12. The apparatus of claim 11, wherein the apparatus further comprises a keeper connected to each of the first output, second output, first evaluation block, and second evaluation block.

13. The apparatus of claim 12, wherein the transistors in the first evaluation block and second evaluation block are N-channel metal-oxide semiconductor (NMOS) transistors, wherein first and second precharge transistor are P-channel metal-oxide semiconductor (PMOS) transistors, and wherein the keeper comprises two PMOS transistors.

* * * * *